Nov. 11, 1930.   N. A. BOOTH   1,781,626
FILE GUIDE FOR SAW SHARPENING
Filed Sept. 4, 1928

Inventor
NICOL A. BOOTH
By
Attorney

Patented Nov. 11, 1930

1,781,626

UNITED STATES PATENT OFFICE

NICOL ALEXANDER BOOTH, OF DUNEDIN, NEW ZEALAND

FILE GUIDE FOR SAW SHARPENING

Application filed September 4, 1928, Serial No. 303,937, and in New Zealand January 4, 1928.

My invention relates to a simple guide, for use in sharpening the teeth of a saw, with a file.

By using my guide, the file can be kept in position when sharpening, to keep the teeth of a saw in uniform shape.

The chief object of the invention is to provide a guide comprising a guide plate and a file holder carried thereby, which file holder may be adjusted relatively to the guide plate in order to change the angularity of a face of the file carried by the file holder to suit the angularity of the fronts of the cutting teeth of a cross-cut saw when the guide and the file carried thereby are used in sharpening such saw.

Referring to the accompanying drawing:—

A is the top, or working edge of the guide plate of the guide for use in filing the alternate teeth of a saw of which the teeth are in a straight line. In using the guide such edge should always be kept parallel with the line of the teeth of the saw, and at the same time that face of the guide adjacent a face of the saw should always be kept parallel to the plane face of the saw.

A' is the bottom edge of the guide plate which becomes the top, or working edge, when the guide is turned over for filing the remaining alternate teeth left untouched at the first operation, the plane faces of the guide and saw being again kept parallel as before.

These operations, of filing alternate teeth of a saw, reversing the saw, and the position of the file, and filing the other alternate teeth, is well known, and so the usual procedure is maintained.

The file holder C of flat metal is pivoted adjacent one of its ends to one face of the guide plate to rock in parallelism with said face. The file holder carries between its ends a socket B which is triangular in cross section.

Figure 1:
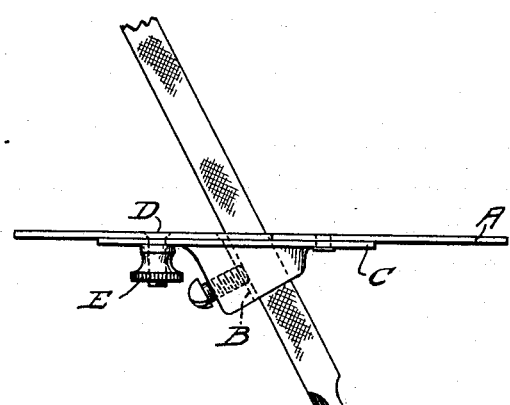
Figure 1 is a plan of my guide for use with a triangular file in sharpening the teeth of a cross-cut saw to the usual shape of the teeth of such saw.
Figure 2:
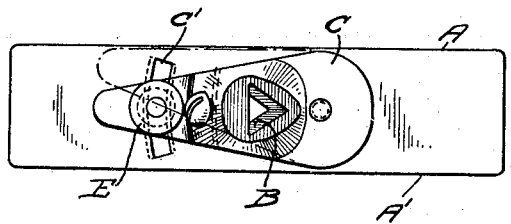
Fig. 2 is the elevation of same.
Figure 3:
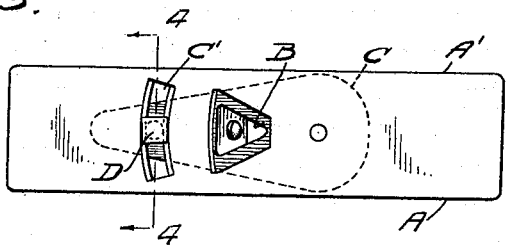
Fig. 3 is an elevation of the guide as viewed from the side thereof opposite to Fig. 2.
Figure 4:
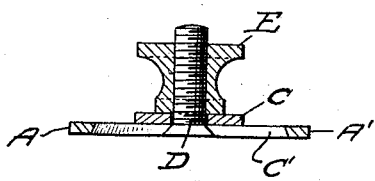
Fig. 4 is a sectional view on the line 4—4 of Fig. 3.

The file holder C, on a line passing diametrically through its pivot point, is of a width slightly less than the width of the guide plate and its longitudinal edges converge toward its opposite end in order that, when the file holder is rocked on its pivot in one direction, one of its longitudinal edges may be brought into alignment with one of the longitudinal edges A or A' of the guide plate as indicated in broken lines in Figure 2, and, when the file holder is rocked in the opposite direction, its opposite edge may be brought into alignment with the other edge of the guide plate.

The wall of the socket B which, when the guide is to be used in sharpening a saw, is to lie opposite the working face of a file mounted therein, is of such angularity to the outer face of the file holder C and also of such angularity to the longitudinal edges of the file holder that, when one longitudinal edge of the file holder is brought into alignment with a longitudinal edge A or A' of the guide plate, the working face of the file will be at the same angularity to the face of the guide plate against which the file holder C bears and to the then uppermost longitudinal edge A or A' of the guide plate, respectively, as the angularity of alternate teeth of a standard cross-cut saw are to one face and to the line of teeth, respectively, of such saw.

Thus when a file is mounted in the socket B and one longitudinal edge of the file holder C is in alignment with one longitudinal edge A or A' of the guide and the file is inserted between a pair of adjacent teeth of a standard cross-cut saw with the then uppermost longitudinal edge of the guide plate parallel with the line of teeth of the saw and that face of the guide plate opposite to the face on which the file holder is mounted is held parallel to a face of the saw, the working face of the file will be presented at the proper angularity to the front of a tooth of the saw to properly sharpen the latter when the guide is reciprocated transversely of the saw.

Means is provided for securing the file holder in adjusted position on the guide. Such means is shown as an arcuate slot C' formed in the guide plate on a radius concentric with the pivot point of the file holder C, a bolt D extending through the slot C' and an opening in the file holder C aligning with said slot, and a thumb nut E on said bolt. By tightening said thumb nut on the bolt, the file holder C will be clamped in adjusted position against the guide plate.

The angularity of the fronts of the teeth of some cross-cut saws to the line of the teeth of such saws is different from the usual or standard angularity, or the faces of the teeth of some saws which were originally of standard angularity sometimes become, after long use and after repeated sharpenings, of a different than standard angularity. In such cases the angularity of the cutting face of the file to a longitudinal edge A or A' of the guide plate must be changed or shifted to fit the angularity of the teeth of such saws in order that, when the guide is to be used in sharpening such teeth, one of its longitudinal edges may be kept parallel to the line of teeth of the saw. My guide provides means for effecting such adjustment. This is done by releasing the thumb nut E which, with the bolt D, clamps the guide holder to the file plate, moving the file holder C on its pivot to bring the cutting face of the file mounted in the socket B into the same angular position relative to a longitudinal edge of the guide plate that the face of the teeth of the saw bear to the line of teeth of such saw and by then tightening up the thumb nut E on the bolt D to clamp the file holder in such position.

After alternate teeth of a saw have been sharpened in the manner described above the file holder C is shifted to bring its opposite longitudinal edge into the same relationship to the opposite longitudinal edge of the guide so as to bring the cutting face of the file into the same angular relationship to the opposite edge of the guide plate that it previously occupied to the other edge of such guide plate. The saw is then reversed and the guide is operated with its other longitudinal edge uppermost in the same manner as before described.

It is obvious that saws for other materials, such for instance as hot or cold metals, stone and such-like could be filed on their teeth as well as those for wood with great advantage to the user, for it is well known that it is a difficult matter to file all the teeth of any saw, uniformly with no guide, and also that many saws do not give the best results.

In this invention any suitable sizes, materials or shapes and angles of the slots, may be adopted.

Having now described the nature of my said invention, what I claim, and desire a patent of the United States of America, is:—

1. A file guide for use in sharpening saws, comprising a guide plate having parallel opposite faces and parallel longitudinal edges and also having an opening between its ends, a file-carrying plate pivoted adjacent one of its ends to one of said faces of said guide plate to rock in a plane parallel to said face, and a file-receiving socket carried by said file-carrying plate and aligning with said opening of said guide plate, said socket having a wall disposed at an inclination to said face of said guide plate and of which the inclination to the opposite edges of said guide plate may be varied by rocking said file-carrying plate on its pivot.

2. A file guide according to claim 1, wherein the longitudinal edges of the file-carrying plate converge from its pivoted end toward its opposite end.

3. A file guide according to claim 1, comprising means for securing the file-carrying plate in adjusted position on the guide plate.

4. A file guide according to claim 1, wherein the guide plate has an arcuate slot concentric with the pivot point of the file-carrying plate, the file carrying plate has an opening aligning with said slot, including means for clamping said file carrying-plate to said guide plate extending through said slot and opening.

5. A file guide according to claim 1, including means for securing the file-carrying plate in adjusted position on the guide plate and wherein the longitudinal edges of the file-carrying plate converge from its pivoted end toward its opposite end.

In testimony whereof I have hereunto set my hand this 12th day of July 1928.

NICOL ALEXANDER BOOTH.